US008260526B2

(12) United States Patent
Loeffler et al.

(10) Patent No.: US 8,260,526 B2
(45) Date of Patent: Sep. 4, 2012

(54) METHOD AND CONTROL DEVICE FOR CALIBRATING A FUEL INJECTOR OF AN INTERNAL COMBUSTION ENGINE; COMPUTER PROGRAM AND COMPUTER PROGRAM PRODUCT

(75) Inventors: Axel Loeffler, Backnang (DE); Wolfgang Fischer, Gerlingen (DE); Roland Karrelmeyer, Bietigheim-Bissingen (DE); Gerald Graf, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 772 days.

(21) Appl. No.: 12/467,425

(22) Filed: May 18, 2009

(65) Prior Publication Data
US 2009/0299608 A1   Dec. 3, 2009

(30) Foreign Application Priority Data
May 30, 2008   (DE) .......................... 10 2008 002 121

(51) Int. Cl.
*G06F 19/00* (2011.01)
*G01M 15/00* (2006.01)
(52) U.S. Cl. ..................................... 701/104; 73/114.45
(58) Field of Classification Search .................. 123/478, 123/480, 486, 490; 701/101–104, 114, 115; 73/114.45, 114.48, 114.49, 114.77; 702/182, 702/183
See application file for complete search history.

(56) References Cited

U.S. PATENT DOCUMENTS

| 4,426,980 | A  | * | 1/1984 | Eisele et al. ................... 123/478 |
| 6,513,371 | B1 | * | 2/2003 | Jett et al. ..................... 73/114.42 |
| 7,231,289 | B2 | * | 6/2007 | Damitz et al. ................. 701/104 |
| 7,894,973 | B2 | * | 2/2011 | Mallebrein et al. ........... 701/104 |
| 7,941,260 | B2 | * | 5/2011 | Lee et al. .......................... 701/59 |

FOREIGN PATENT DOCUMENTS

| DE | 41 34 304     | 4/1993  |
| DE | 103 59 306    | 7/2005  |
| DE | 10 2005 051 701 | 5/2007 |
| DE | 10 2006 021 301 | 11/2007 |
| WO | WO 2006/048372 | 11/2006 |

* cited by examiner

*Primary Examiner* — Willis Wolfe, Jr.
(74) *Attorney, Agent, or Firm* — Kenyon & Kenyon LLP (57) ABSTRACT

A method and a device, a computer program and a computer program product for implementing a method for calibrating a fuel injector of an internal combustion engine, including the following: a) Specifying a first relationship between an injection quantity and an actuating variable of the fuel injector for implementing the injection quantity, b) Specifying a setpoint injection quantity, c) Specifying at least one setpoint value for the actuating variable of the fuel injector according to the first relationship, or implementing the setpoint injection quantity, d) Determining an indicated work resulting from the implementation of the at least one setpoint value for the actuating variable, e) Comparing a variable as a function of the determined resulting indicated work to an expected value, f) Correcting the at least one setpoint value for the actuating variable of the fuel injector as a function of the comparison result.

19 Claims, 4 Drawing Sheets

METHOD AND CONTROL DEVICE FOR CALIBRATING A FUEL INJECTOR OF AN INTERNAL COMBUSTION ENGINE; COMPUTER PROGRAM AND COMPUTER PROGRAM PRODUCT

RELATED APPLICATION INFORMATION

The present application claims priority to and the benefit of German patent application no. 102008002121.0, which was filed in Germany on May 30, 2008, the disclosure of which is incorporated herein by reference.

FIELD OF THE INVENTION

The present invention is based on a method and a control device for calibrating a fuel injector, and on a computer program and a computer program product therefor.

BACKGROUND INFORMATION

A method and a device for operating an internal combustion engine are discussed in DE 10 2005 051 701 A1, in which an overall injection is subdivided into a basic injection and at least one measured injection. The injection period of the measured injection is successively reduced and the injection period of the basic injection is increased, in such a way that an overall injection quantity determined from a characteristics curve of the valve remains unchanged. A deviation of a variable characterizing an actual mixture, provoked by the successive reduction of the injection period of the measured injection, from a variable characterizing a setpoint mixture is detected. The deviation or a characteristics curve of the fuel injector is adapted or corrected. The detection as to whether the actual fuel-air mixture is deviating from the setpoint fuel-air mixture take place with the aid of a Lambda value provided by a Lambda sensor.

SUMMARY OF THE INVENTION

In contrast, the method of the present invention, the control device of the present invention, the computer program of the present invention and the computer program product of the present invention having the features of the independent claims have the advantage that
a) A first relationship is specified between an injection quantity and an actuating variable of the fuel injector for implementing the injection quantity;
b) A setpoint injection quantity is specified;
c) At least one setpoint value is specified for the actuating variable of the fuel injector according to the first relationship for implementing the setpoint injection quantity;
d) An indicated work resulting from the implementation of the at least one setpoint value for the actuating variable is determined;
e) A variable as a function of the determined resulting indicated work is compared to an expected value;
f) The at least one setpoint value for the actuating variable of the fuel injector is corrected as a function of the comparison result.

In this way a variable which is a function of the resulting indicated work is determined as feedback of the combustion independently of the fuel-air mixture.

Advantageous further developments and improvements of the method described in the independent claim are rendered possible by the measures delineated in the dependent claims.

It is especially advantageous if the at least one setpoint value for the actuating variable of the fuel injector in step c) is corrected with the aid of a first correction characteristics curve; the correction in step f) is implemented with the aid of the first correction characteristics curve; and the correction characteristics curve in step f) is corrected as a function of the correction result. This makes it possible to correct the setpoint value for the actuating variable of the fuel injector with the aid of a first correction factor averaged across several specimens of the fuel injector, which results in an improvement in the running smoothness of the internal combustion engine and a reduction in the knocking tendency of the internal combustion engine.

In an advantageous manner, the injection quantity is then selected as the variable as a function of the determined resulting indicated work. In combustion methods having excess air, the correction of the relationship between the injection quantity and the actuating variable of the fuel injector for implementing the injection quantity is therefore determined directly.

One specific embodiment, in which the injection quantity is determined as a function of the determined resulting indicated work and the engine speed, in particular with the aid of a characteristics map, is especially advantageous. This makes it possible to determine the injection quantity in an especially simple and precise manner with little effort. When using a characteristics map, additional influence variables such as the effects of the fuel type and the ambient conditions are able to be taken into account. This increases the accuracy.

It is especially advantageous if the setpoint injection quantity is selected as expected value since a correction factor for the relationship between the injection quantity and the actuating variable of the fuel injector for implementing the injection quantity is able to be calculated directly on the basis of the comparison of the setpoint injection quantity on the one hand and the actual injection quantity determined from, for example, the resulting indicated work and the engine speed, on the other. This allows a simple implementation of the method, which has a positive effect on the production cost.

One specific embodiment of the method according to the present invention, in which the resulting indicated work itself is selected as the variable as a function of the determined resulting indicated work, is especially advantageous. This avoids additional computing steps. As a result, the method is able to be implemented in a control device more easily.

A setpoint value for the resulting indicated work is then expediently selected as expected value since the comparison between the expected value and the determined resulting indicated work is thus able to be implemented in an uncomplicated manner in a control device.

Especially advantageous is a specific embodiment in which the setpoint value for the resulting indicated work is determined in the following manner:

The setpoint injection quantity is implemented into a single setpoint actuating variable according to the first relationship; the determined resulting indicated work that comes about is selected as setpoint value for the resulting indicated work. Thus, an expected value suitable for implementing the method according to the present invention is able to be determined with little effort for any suitable operating point of the internal combustion engine.

The resulting indicated work is advantageously determined as a function of the combustion chamber pressure. The use of combustion-chamber pressure sensors offers the advantage that the acquisition of the resulting indicated work takes place individually for each combustion chamber; furthermore, in combustion engines having more than one combustion chamber, a complicated und possibly error-prone conversion of the resulting indicated work, from the plurality of combustion chambers to one combustion chamber, is able to be dispensed with. This increases the precision of the correction.

Especially advantageous is one specific development, which is characterized by the fact that the setpoint injection quantity according to the first relationship is converted into a single setpoint actuating variable and that the correction in f) according to a first correction factor is implemented as a function of the quotient between the setpoint injection quantity on the one hand and the actual injection quantity derived from the resulting indicated work on the other hand. This makes it possible to determine the correction factor as a function of a simple division without additional complex computing steps.

Especially advantageous is one specific embodiment, which is characterized in that the setpoint injection quantity is subdivided into a basic injection quantity and a measured injection quantity; the basic injection quantity is implemented by a basic setpoint actuating variable as a function of the first relationship; and the measured injection quantity is implemented by a measured setpoint actuating variable as a function of the first relationship. Because of the unvarying full setpoint injection quantity, the injection quantity supplied to the combustion does not change or changes only negligibly, so that correction factors in the entire range of the injection quantities realizable by the fuel injector are able to be determined with minimal effect on the running smoothness of the internal combustion engine and while avoiding a standstill of the internal combustion engine.

In an advantageous manner, the basic injection quantity is implemented by the basic setpoint actuating variable according to the actuating variable of the fuel injector corrected by the first correction factor. This further increases the precision of the correction.

Especially advantageous is a development, which is characterized in that the measured setpoint actuating variable, assigned to the measured injection quantity via the specified first relationship, is varied as a function of the deviation between the variable as a function of the determined resulting indicated work and the expected value, in order to adjust the variable as a function of the determined resulting indicated work to the expected value; and the correction of the at least one setpoint value for the actuating variable of the fuel injector at f) is implemented as a function of a determined corrected measured actuating variable, at which the deviation between the variable as a function of the determined resulting indicated work and the expected value lies within a predefined tolerance range. By utilizing available control algorithms for the indicated work, for example, it is possible to realize an especially simple and reliable implementation of the method according to the present invention in this manner.

The first correction factor is advantageously determined as a function of the quotient from the measured actuating variable and the corrected measured actuating variable. This further simplifies the method according to the present invention.

Especially advantageous is one specific development in which the correction implemented in f) according to the first correction factor is formed as a function of the quotient between a difference from the setpoint injection quantity and the basic injection quantity on the one hand, and a difference from the actual injection quantity derived from the determined resulting indicated work and the basic injection quantity on the other hand. This makes it possible to correct the relationship between the injection quantity and an actuating variable of the fuel injector in an especially satisfactory manner since the difference between setpoint injection quantity and actual injection quantity is able to be traced back directly to the measured setpoint actuating variable.

In an advantageous manner, the electric control period is used as actuating variable of the fuel injector because this variable is able to be set very precisely with the aid of an electronic control device.

The setpoint injection quantity is advantageously selected greater than a first threshold value. In this way, the internal combustion engine is able to be operated without risking a standstill.

Specific embodiments of the present invention are illustrated in the drawing and explained in greater detail in the following description.

DETAILED DESCRIPTION

Figure 1:
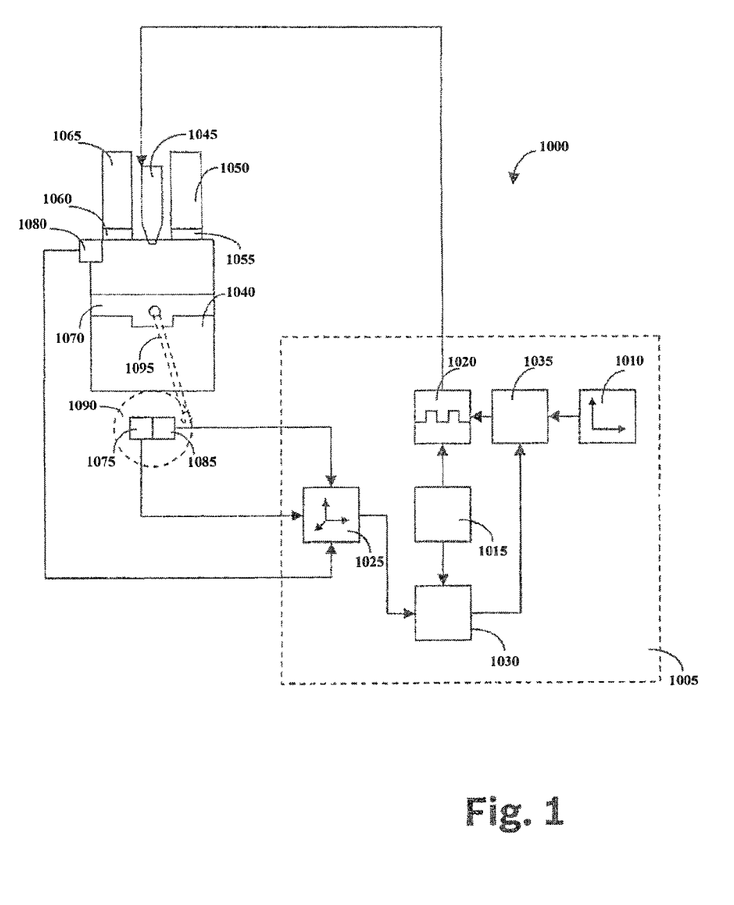
FIG. 1 shows a schematic illustration of an internal combustion engine having direct gasoline injection through a fuel injector.

FIG. 1 schematically illustrates the configuration of an internal combustion engine 1000, for instance an Otto engine or a Diesel engine. This internal combustion engine 1000 has a plurality of combustion chambers 1040, having self ignition, for implementing a homogenous combustion method; for reasons of clarity, however, only one combustion chamber is illustrated in FIG. 1. In addition, internal combustion engine 1000 includes an intake manifold 1050 for the supply of air, and a fuel injector 1045, which injects fuel into combustion chamber 1040 in such a way that a homogenous air/fuel mixture comes about inside combustion chamber 1040. This homogenous air-fuel mixture is supplied with energy by the movement of a piston 1070 by compression of the homogenous air-fuel mixture until it self-ignites inside combustion chamber 1040. A discharge valve 1060 and an exhaust gas pipe 1065 are used to route the combustion exhaust gases to the outside.

The determination of the opening instants and the opening periods of intake valve 1055 and discharge valve 1060 in a working cycle is implemented with the aid of an engine control device, for example as a function of the position of piston 1070. This piston 1070 is connected to a crankshaft 1090 via a connection rod 1095. In the case of a four-stroke engine, the working cycle denotes the cycles of aspiration, compression, expansion and expulsion, for example. These cycles are assigned to the position of piston 1070 or a crankshaft angle detected by a crankshaft sensor 1085 in a manner known to one skilled in the art.

During the expansion, an energy released by the combustion of the air-fuel mixture is partially transmitted as mechanical energy to crankshaft 1090 via piston 1070 by connection rod 1095. A resulting torque is then available at crankshaft 1090.

Internal combustion engine 1000 also has an engine speed sensor 1075 for detecting the rotational speed of internal combustion engine 1000, a sensor 1080 for detecting the combustion chamber pressure, as well as a control device 1005.

Control device 1005 includes a first input unit 1010, a second input unit 1015, a third input unit 1020, a determination unit 1025, a comparison unit 1030, a correction unit 1035, as well as a volatile memory (not shown in FIG. 1), and a non-volatile memory (not shown in FIG. 1).

Two types of fuel injectors 1045 are typically used for the injection with the aid of fuel injector 1045. These are solenoid valves and piezo valves. Piezo valves are characterized by high precision of the injected fuel quantity, but are currently very expensive in their production in comparison with solenoid valves. The exemplary embodiments and/or exemplary methods of the present invention is able to be used regardless of the type of fuel injector 1045 employed and is described in the following text using the example of a solenoid valve. The method of the present invention is used analogously for piezo valves.

In a manner known to one skilled in the art, a first relationship 204, a first correction characteristics curve 301, a first threshold value, a status datum, in particular a status bit SKAL, as well as a second threshold value BET are stored in the non-volatile memory of control device 1005.

Figure 2:
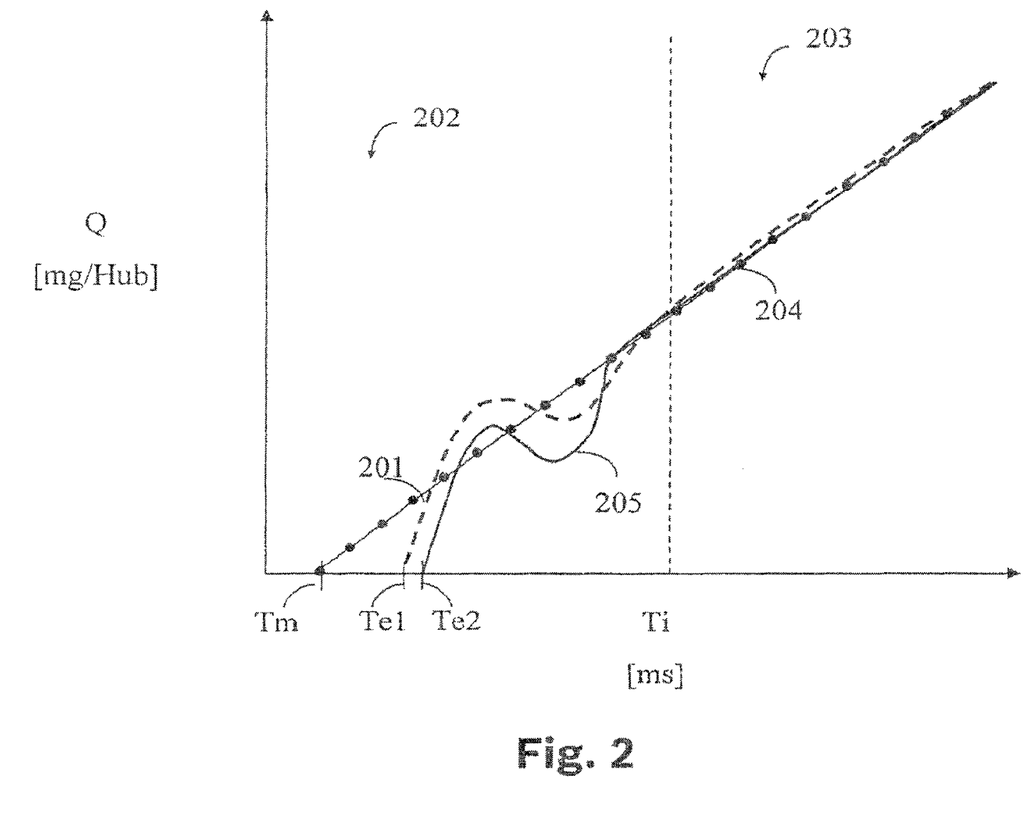
FIG. 2 shows a first, a second, and a third relationship between an injected fuel quantity and an electric control period of the fuel injector from FIG. 1.

FIG. 2 illustrates first relationship 204 between an injection quantity Q and an actuating variable of fuel injector 1045, especially an electric control period $T_i$ of fuel injector 1045, as injection behavior of a solenoid valve, for example. First relationship 204 is an unambiguous, for instance linear, relationship between injection quantity Q and electric control period $T_i$. First relationship 204 is specified by the manufacturer of fuel injector 1045, for example.

As can be gathered from FIG. 2, first relationship 204 is represented by a straight line, which starts on the positive axis at a point $T_i=T_m$ that differs from zero and then rises for increasing $T_i$'s. For storage, for instance in the non-volatile memory in control device 1005 of internal combustion engine 1000, predefined values for injection quantity Q are selected from a value range. The value range encompasses all possible injection quantities Q implementable by fuel injector 1045, such as from 0 mg to 25 mg. The predefined values for injection quantity Q and associated electric control periods $T_1$ are stored in a first data area in the non-volatile memory of control device 1005 in a manner known to one skilled in the art. The predefined values for injection quantity Q are represented by dots on the straight line in FIG. 2.

Solenoid valves for internal combustion engines 1000 which are used in motor vehicles exhibit a strong non-linearity with respect to the relationship of injection quantity Q and electric control period $T_1$, especially for smaller injection quantities Q such as less than 7 mg. The actual injection behavior of fuel injector 1045 for a specific sample of fuel injector 1045 is shown as second relationship 201 between injection quantity Q of electric control period $T_i$ in FIG. 2. It can be gathered from FIG. 2 that second relationship 201 starts after a dead zone at a value of $T_i=T_{e1}$ on the positive x-axis. Injection quantity Q is equal to zero for values $T_i<T_{e1}$. For the values $T_i>T_{e1}$, second relationship 201 increases up to a maximum value. Second relationship 201 drops to a minimum value in the further course, in order to subsequently approach a linear relationship with a decreasing slope. Second relationship 201 intersects first relationship 204 before and after second relationship 201 assumes its minimum value.

A third relationship 205 in FIG. 2 exemplarily represents the relationship between injection quantity Q and electric control period $T_i$ averaged across a plurality of samples of fuel injector 1045. To determine third relationship 205, the injection behavior of a plurality of fuel injectors 1045 is measured on a test stand, for example, by measuring actual injection quantity Q injected by fuel injector 1045 at a specific electric control period $T_i$, the measurement being carried out with the aid of a flow-rate meter. Afterwards, third relationship 205 is determined in the manner known to one skilled in the art by forming the average value from the injection behavior of individual fuel injectors 1045. From FIG. 2 it can be gathered that third relationship 205 starts after a dead zone at a value of $T_i=T_{e2}$ on the positive x-axis. Injection quantity Q is equal to zero for values $T_i<T_{e2}$. For values $T_i>T_{e2}$, third relationship 205 increases up to a maximum value. Third relationship 205 drops to a minimum value in the further course and then approaches a linear relationship at a decreasing slope. Third relationship 205 intersects second relationship 201 twice after third relationship 205 has exceeded its minimum value.

Depending on the lower running limit of the internal combustion engine, i.e., the particular injection quantity Q at which internal combustion engine 1000 will actually not come to a standstill as a function of the model type and engine speed of internal combustion engine 1000, a first threshold value is defined, which lies between 5-8 mg per stroke or working cycle. In the case of a 4-stroke engine of a motor vehicle, for instance, a working cycle includes the cycles of aspiration, compression, working, expelling. With the aid of this first threshold value it is possible to subdivide first relationship 204 into two ranges: a first range 202 of smaller injection quantities Q, and a second range 203 of greater injection quantities Q. Smaller injection quantities Q are injection quantities Q that are smaller than injection quantity Q of the lower smooth running limit.

The first threshold value, for instance, is able to be determined by measuring an internal combustion engine 1000 on a test stand; a flow-rate meter measures actual injection quantity Q, which is injected during a specific electric control period $T_i$ of fuel injector 1045. Electric control period $T_i$ is reduced in equidistant increments of 1 mg per stroke, starting at 10 mg, until the smooth running limit is exceeded, i.e., when internal combustion engine 1000 is coming to a standstill. Then, the first threshold value is stored, for instance in a second data area in the non-volatile memory in control device 1005.

Figure 3:
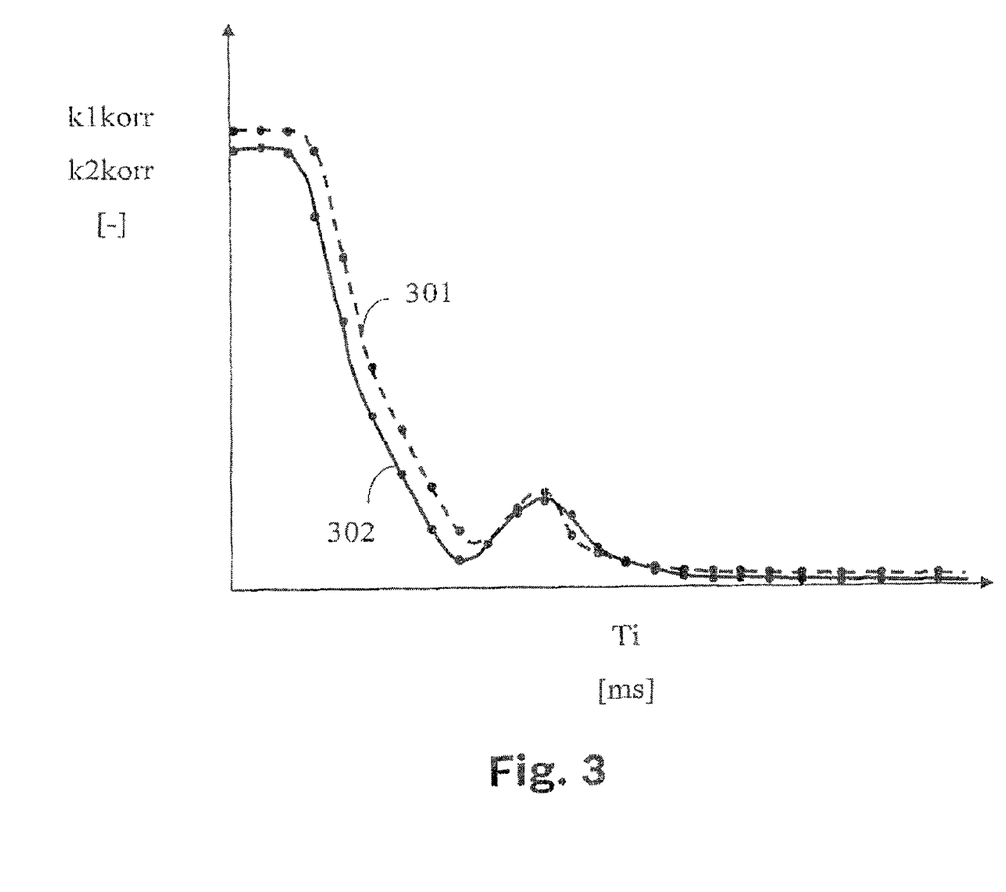
FIG. 3 shows a first and a second correction characteristics curve, which represents the relationship between a first and a second correction factor and the electric control period of the fuel injector from FIG. 1.

FIG. 3 shows a first correction characteristics curve 301, which represents the correlation of electric control period $T_i$ and first correction factors $k1_{corr}$. Starting from a starting value that differs from zero, for example, first correction characteristics curve 301 is constant to begin with and then drops to a minimum at a steep slope. First correction characteristics curve 301 subsequently rises to a maximum, then drops at a decreasing slope and approaches the x-axis. For the storing in a non-volatile memory in control device 1005, for instance, the same electric control periods $T_1$ are selected as for the storing of first relationship 204. These electric control periods $T_1$ together with the associated first correction factors $k1_{corr}$ are stored in the non-volatile memory of control device 1005 in a third data area in a manner known to one skilled in the art. The corresponding values for electric control periods $T_1$ and associated first correction factors $k1_{corr}$ are represented by points on the characteristics curve.

For each of the first correction factors $K1_{corr}$, the status information by which a distinction is made as to whether the particular first correction factor $K1_{corr}$ is to be calibrated is also stored in the third data area. The status information is stored prior to the first operation of the internal combustion engine in the manner known to one skilled in the art such as with the aid of a status bit SKAL. Status bit SKAL may assume the values TRUE or FALSE, for example. TRUE means that first correction factor $K1_{corr}$ has already been calibrated. FALSE means that first correction factor $K1_{corr}$ was not calibrated. Status bit SKAL is set to FALSE prior to the first operation of the internal combustion engine.

FIG. 3 also shows a relationship between electric control period $T_1$ and a second correction factor $k2_{corr}$, as a second correction characteristics curve 302. Starting from a starting value that differs from zero, second correction characteristics curve 302 initially remains constant, for instance, and then drops sharply to a minimum. Afterwards, second correction characteristics curve 302 rises to a maximum and then drops at a decreasing slope and approaches the x-axis. First correction characteristics curve 301 intersects second correction characteristics curve 302 a first time, for instance, shortly after the maximum value of first correction characteristics curve 301, and a second time before first correction characteristics line 301 approaches the x-axis.

Since first correction factors $K1_{corr}$ are not known prior to executing the method of the exemplary embodiments and/or exemplary methods of the present invention for the first time, the corresponding second correction factor $k2_{corr}$ from second correction characteristics curve 302 is stored for each of the first correction factors $k1_{corr}$ in the third data area of the non=volatile memory in control device 1005, before the internal combustion engine's first operation.

For this purpose, the same electric control periods $T_i$ are selected for storage in the non-volatile memory in control device 1005 of internal combustion engine 1000 as in the storing of the first relationship 204. FIG. 3 shows the corresponding values for electric control periods $T_i$ and associated second correction factors $k2_{corr}$ as points on the characteristics curve.

In addition, second threshold value BET is stored in the non-volatile memory in control device 1005. Prior to the first operation, second threshold value BET is set to equal 10 hours and stored in the non-volatile memory in control device 1005.

First input unit 1010 specifies first relationship 204 to correction unit 1035. First relationship 204 is stored in a non-volatile memory in control device 1005, for example.

Second input unit 1015 specifies a setpoint injection quantity $Q_{setpoint}$ to third input unit 1020 and comparison unit 1030. Setpoint injection quantity $Q_{setpoint}$ may assume random values within the specific value range. To determine setpoint injection quantity $Q_{setpoint}$ an injection quantity $Q_{driver}$ requested by the driver is first determined in a manner known to one skilled in the art, for instance as a function of the accelerator position if a motor vehicle is involved. From this, setpoint injection $Q_{setpoint}$ is determined. In a normal operation of the internal combustion engine, injection quantity $Q_{driver}$ requested by the driver is greater than the first threshold value. Setpoint injection $Q_{setpoint}$ corresponds to injection quantity $Q_{driver}$ requested by the driver, for instance.

As described in the following text, correction unit 1035 determines first correction characteristics curve 301, status bit SKAL, second threshold value BET, and stores them in the non-volatile memory in control device 1005, for example.

Third input unit 1020 determines a setpoint value for electric control period $T_i$ of fuel injector 1045 as a function of setpoint injection quantity $Q_{setpoint}$. The setpoint value for electric control period $T_i$ of fuel injector 1045 is determined during normal operation of internal combustion engine 1000, using first relationship 204 and first correction characteristics curve 301. To this end, a linear electric control period $T_{in}$ is determined from setpoint injection quantity $Q_{setpoint}$ with the aid of the first relationship, using interpolation, for instance.

Then, using first correction characteristics curve 302, first correction factor $K1_{corr}$ is determined from the electric control period $T_{lin}$ thus determined, using interpolation, for instance. Next, electric control period $T_1$ is calculated by multiplying linear electric control period $T_{lin}$ by first correction factor $K1_{corr}$ associated with this linear electric control period $T_{lin}$, in the following manner:

$$T_i = T_{lin} * K1_{korr}(T_{lin}).$$

In a manner known to one skilled in the art, third input unit 1020 also determines a setpoint actuating variable for fuel injector 1045, which corresponds to the setpoint value of electric control period $T_1$, such as a current signal, and inputs it for fuel injector 1045.

Determination unit 1025 continually records the engine speed of internal combustion engine 1000, which is transmitted by engine speed sensor 1075, the angle of crankshaft 1090, which is recorded by crankshaft angle sensor 1085, and the combustion chamber pressure, which is transmitted by sensor 1080, and stores them in the volatile memory in control device 1005, for example. Moreover, determination unit 1025 determines the resulting indicated work and an associated actual injection quantity $Q_{actual}$. The resulting indicated work for a working cycle is calculated, for instance as integral of the combustion chamber pressure over the crank angle during the working cycle. Determination unit 1025 determines actual injection quantity $Q_{actual}$ from the resulting indicated work and the engine speed of internal combustion engine 1000, for example with the aid of a characteristics map that represents the relationship between resulting indicated work, the engine speed of internal combustion engine 1000, and injection quantity Q.

The characteristics map for internal combustion engine 1000 is determined on a test stand during an application phase in that individual operating points having a specific engine speed of internal combustion engine 1000 and different resulting indicated works of internal combustion engine 1000 are set to stationary, and the associated injection quantity Q per working cycle is measured with the aid of a flow rate measuring device. The operating points are set at equidistant increments with respect to one another, for example. The characteristics map determined in this manner is stored in determination unit 1025, for instance in the non-volatile memory in control device 1005.

Comparison unit 1030 performs comparison operations between setpoint injection quantity $Q_{setpoint}$ transmitted by second input unit 1015, and actual injection quantity $Q_{actual}$ transmitted by determination unit 1025.

Because of the non-linearities in the injection behavior of an individual fuel injector 1045, especially in first range 202, shown in FIG. 2 in second relationship 201 by way of example, the precision of the metering of the injected fuel that is required in order to implement the homogenous combustion method having self-ignition will not be reached if only first relationship 204 from FIG. 2 is utilized to calculate electric control period $T_i$ of fuel injector 1045. To obtain the required precision in the metering of the injection quantities, the actuating variable of fuel injector 1045 is corrected with the aid of suitable first correction factors $K1_{corr}$, and fuel injector 1045 is calibrated in this manner.

This calibration is described in greater detail in the following text and makes it possible, for instance, to compensate for the influences of the deviation between the actual opening period of fuel injector 1045 and electric control period $T_i$ caused by manufacturing tolerances, installation-related tolerances, the effects of aging and/or drift on the precision of the metering of injection quantities Q injected by fuel injector 1045.

A first specific embodiment will now be described on the basis of the flow chart from FIG. 4.

The program begins after the start of internal combustion engine 1000. The method according to the present invention may be terminated at any time, for example by turning off control device 1005 of internal combustion engine 1000. The steps towards this end are known to one skilled in the art and are not described here in greater detail.

Following the start of the program, an injection quantity $Q_{driver}$ desired by the driver is determined in a step 400 in the manner known to one skilled in the art, such as, for example, from the accelerator position in the case of a motor vehicle.

The method then branches to a program point 405.

In step 405 it is checked whether a suitable driving situation is at hand. If a suitable driving situation is present, then branching to step 410 takes place. If not, branching to step 407 occurs. A suitable driving situation exists, for instance, whenever internal combustion engine 1000 is operated at an approximately constant engine speed other than zero, in such a way that an approximately constant torque is available at crankshaft 1090.

In step 407 it is checked, in a manner known to one skilled in the art, whether the number of operating hours is less than second threshold value BET, e.g., 10 hours. If yes, then branching to a step 445 takes place. If no, branching to a step 409 occurs.

In step 409, status bit SKAL of each first correction factor $k1_{corr}$ is set to FALSE in the third data area of the non-volatile memory in control device 1005 in a manner known to one skilled in the art. Moreover, second threshold value BET is increased by a predefined first amount, such as 10 hours, for instance. Next, branching to step 405 takes place.

In step 445, setpoint injection quantity $Q_{setpoint}$ is set to equal injection quantity $Q_{driver}$ requested by the driver. The method then branches to a program point 447.

In step 447, first relationship 204 and first correction characteristics curve 301 are read out from the non-volatile memory in control device 1005, for example. The method then branches to a step 450.

In step 450, linear electric control period $T_{lin}$ is determined from setpoint injection quantity $Q_{setpoint}$ with the aid of first relationship 204, using interpolation, for instance. The method then branches to a step 455.

In step 455, first correction factor $k1_{corr}$ is determined from linear electric control period $T_{lin}$ with the aid of first correction characteristics curve 301, using interpolation, for instance. The method of the present invention then continues with a step 460.

In step 460, the setpoint value for electric control period $T_i$ is determined by multiplying linear electric control period $T_{lin}$ by first correction factor $k1_{corr}$. The method then branches to a step 465.

In step 465, fuel injector 1045 is triggered according to the setpoint value for electric control period $T_i$. Next, branching to step 405 takes place.

In step 410, setpoint injection quantity $Q_{setpoint}$ is determined from injection quantity $Q_{driver}$ requested by the driver. Within the specific value range of all injection quantities Q able to be realized by fuel injector 1045, such as from 0 to 25 mg, for instance, setpoint injection quantity $Q_{setpoint}$ assumes only predefined values for injection quantity Q.

The number of predefined values for injection quantity Q is specified by the resolution of first relationship 204. The resolution is selected prior to the start of the method, for instance as a function of the non-volatile memory in control device 1005 available for storing first relationship 204 and first correction characteristics curve 301. The increments between the predefined values for injection quantity Q are freely variable. Depending on the desired resolution, for example, the predefined values for injection quantity Q are subdivided in equidistant increments across the specific value range of all injection quantities able to be realized by fuel injector 1045. At a desired resolution of 1 mg, for example, 26 interpolation points are equidistantly distributed in the specific value range of 0 mg to 25 mg, with increments of 1 mg.

As an alternative, it is possible to select smaller increments in order to obtain greater resolution in areas of second relationship 201 that are more heavily non-linear. Larger increments may be selected in the approximately linear areas of second relationship 201, for example, in order to use less memory space in the non-volatile memory in control device 1005.

From injection quantity $Q_{driver}$ desired by the driver, setpoint injection $Q_{setpoint}$ is then determined in that the particular predefined value for injection quantity Q that comes closest the injection quantity $Q_{driver}$ is selected from the specific value range of all injection quantities Q able to be realized by fuel injector 1045, for instance by commercial rounding. If, for instance, 5.5 mg is determined as injection quantity $Q_{driver}$, then setpoint injection quantity $Q_{setpoint}$=6 mg is specified if the next-closest predefined values for injection quantity Q are 5 mg and 6 mg.

Via first relationship 204, predefined values of electric control period $T_i$ are assigned to the predefined values for injection quantity Q. The predefined values for electric control period $T_i$ corresponding to the predefined values for injection quantity Q form the x-interpolation points of first correction characteristics curve 301 of FIG. 3.

The method then branches to a program point 411.

In step 411, first relationship 204 is read out of the non-volatile memory in control device 1005. The method then branches to a step 415.

In step 415, linear electric control period $T_{lin}$ is determined from the predefined value for injection quantity Q with the aid of first relationship 204. The method then branches to a step 416.

In step 416, the status of status bit SKAL for first correction factor $k1_{corr}$ assigned to linear electric control period $T_{lin}$ via first correction characteristic curve 301 is read out of the third data area of the non-volatile memory in control device 1005. The method then branches to a step 417.

In step 417 it is checked whether the status of status bit SKAL equals TRUE for first correction factor $k1_{corr}$ assigned to the predefined value for injection quantity Q. If this is the case, branching to step 407 takes place. Otherwise, the method branches to a step 418.

In step 418, the setpoint value for electric control period $T_i$ is determined as a function of linear electric control period $T_{lin}$ and first correction factor $k1_{corr}$ in the following manner:

$$T_i = T_{lin} * K1_{korr}(T_{lin}).$$

The method of the present invention then continues with a step 420.

In step 420, fuel injector 1045 is triggered using a setpoint value for a current signal, for instance, which value corresponds to electric control period $T_i$ from step 418. The method then branches to a step 425.

In step 425, the resulting indicated work is calculated in the manner known to one skilled in the art, for instance as integral of the combustion chamber pressure over the crank angle during the working cycle in which the control in step 420 took place. To this end, the combustion chamber pressure is recorded continually and stored in the volatile memory in control device 1005 to calculate the integral, for instance in a variable. The method then branches to a step 430.

In step 430, associated actual injection quantity $Q_{actual}$ is determined from the resulting indicated work and the engine speed of internal combustion engine 1000, for example with the aid of a characteristics map that represents the relationship between resulting indicated work, the engine speed of internal combustion engine 1000, and injection quantity Q. An average value of the rotational speed of internal combustion engine 1000 during the working cycle, for instance, is determined as rotational speed in a manner known to one skilled in the art. The method then branches to a step 435.

In step 435, first correction factor $k1_{corr}$ is determined as a function of the comparison result of the comparison between setpoint injection quantity $Q_{setpoint}$ from step 410, and actual injection quantity $Q_{actual}$ from step 430, for instance as quotient, according to the following formula:

$$K1_{corr} = Q_{Setpoint}/Q_{actual}$$

This first correction factor $K1_{corr}$ is stored in correction unit 1035 in the non-volatile memory in control device 1005 as part of first correction characteristics curve 301. The status of the associated status bit is set to TRUE. The method is then continued by step 405.

A second specific embodiment differs from the first specific embodiment in that, in step 410, setpoint injection quantity $Q_{setpoint}$ is subdivided into a basic injection quantity $Q_{basic}$ and a measured injection quantity $Q_{meas}$.

Measured injection quantity $Q_{meas}$ is determined in such a way that it corresponds to one of the predefined values for injection quantity Q from the specific value range of all possible injection quantities Q able to be realized by fuel injector 1045, for example from 0 mg to 25 mg. For measured injection quantity $Q_{meas}$, for instance, the smallest predefined value for injection quantity Q is selected from first range 202 of smaller injection quantities, for which no first correction factor $k1_{corr}$ has yet been determined. To this end, status bits SKAL of each first correction factor $k1_{corr}$ are evaluated in the manner known to one skilled in the art.

Basic injection quantity $Q_{basic}$ is determined by subtracting measured injection quantity $Q_{meas}$ from setpoint injection quantity $Q_{setpoint}$, for example. The method then branches to a step 411.

In step 415, in contrast to the first specific embodiment, a first basic setpoint actuating variable, in particular an electric control period $T_{basic}$, for fuel injector 1045 is determined from the basic injection quantity $Q_{basic}$ and as a function of the linear, electric control period $T_{lin}$ and first correction factor $k1_{corr}$, the determination being implemented in the following manner.

$$T_{basic} = T_{lin}(Q_{basic}) * K1_{corr}(T_{lin}(Q_{basic})).$$

From measured injection quantity $Q_{meas}$, a measured setpoint actuating variable, in particular a second electric control period $T_{meas}$, is determined as a function of first relationship 204 between injection quantity Q and electric control period $T_i$ and as a function of linear electric control period $T_{lin}$ and first correction factor $k1_{corr}$, the determination being implemented in the following manner.

$$T_{meas} = T_{lin}(Q_{meas}) * K1_{corr}(T_{lin}(Q_{meas}))$$

Steps 416, 417 and 418 are omitted in the second specific embodiment.

In step 420, which follows step 415, fuel injector 1045—in contrast to the first specific embodiment—is triggered using a first actuating variable corresponding to first electric control period $T_{basic}$, and a second actuating variable corresponding to second electric control period $T_{meas}$, in a manner known to one skilled in the art, in such a way that both injections do not overlap and take place in the same working cycle, e.g., during the intake stroke and/or during the compression stroke.

Steps 425 and 430 do not differ from the first specific embodiment.

In step 435, in contrast to the first specific development, first correction factor $k1_{corr}$ is formed as a function of the comparison result as quotient between a difference from setpoint injection quantity $Q_{setpoint}$ and basic injection quantity $Q_{basic}$ on the one hand, and a difference between actual injection quantity $Q_{actual}$ derived from the resulting indicated work, and basic injection quantity $Q_{basic}$ on the other hand. The quotient is calculated according to the following formula, for instance:

$$K1_{corr} = (Q_{setpoint} - Q_{basic})/(Q_{actual} - Q_{basic}).$$

In this context it is assumed that basic injection quantity $Q_{basic}$ has actually been injected via the electric control period $T_{basic}$ specified by first relationship 204, and that the difference from setpoint injection quantity $Q_{setpoint}$ and actual injection quantity $Q_{actual}$ was caused by variances of measured injection quantity $Q_{meas}$ as a result of manufacturing tolerances or aging effects of fuel injector 1045, for example. First correction factor $k1_{corr}$ determined in this manner is once again stored in the non-volatile memory in control device 1005 as part of first correction characteristics curve 301. The method then continues with step 405.

In a third specific embodiment, in contrast to the second specific embodiment, a single setpoint value for electric control period $T_i$ of fuel injector 1045 is determined from setpoint injection quantity $Q_{setpoint}$ during the initial pass through step 410.

Then, steps 420 through 430 are run though, and the resulting indicated work determined during the first pass through step 430 is stored in the volatile memory in control device 1005, for instance as variable, for the further course of the method.

Step 435 is omitted in the first run-through, and the method continues with step 410.

In the second pass through step 410, setpoint injection quantity $Q_{setpoint}$ is then split up, as described in the second specific embodiment, into a basic injection quantity $Q_{basic}$ and a measured injection quantity $Q_{meas}$.

In step 415, in contrast to the second specific embodiment, a third electric control period $T_{elin}$ is determined in addition, as a function of first relationship 204 between injection quantity Q and electric control period $T_i$, in the following manner.

$$T_{elin} = T_{lin}(Q_{meas}).$$

Steps 416 through 425 do not differ from the second specific development.

Step 430 differs from the second specific embodiment in that in this instance only the resulting indicated work is determined while the determination of actual injection quantity $Q_{actual}$ is dispensed with.

Step 435 differs from the second specific embodiment in that the resulting indicated work previously stored in the first run-through of step 430 is forwarded to a controller as expected value. A measured actuating variable, in particular second opening duration $T_{meas}$, is then corrected by the output of the controller in such a way that the resulting indicated work lies within a predefined tolerance range around the expected value for the indicated work. The tolerance range is appropriately selected for the particular type of valve on a test stand prior to implementing the method according to the present invention, or it is selected as zero. A corrected measured actuating variable obtained in this manner, in particular a corrected second electric control period $T_{corr}$, is used to correct first relationship 204 from FIG. 2. First correction factor $k1_{corr}$ is calculated as a function of the correction result, as quotient from the corrected second electric control period $T_{corr}$, found by the control, and third electric control period $T_{elin}$ associated with measured injection quantity $Q_{meas}$, the calculation being implemented in the following manner:

$$K1_{corr}=T_{corr}/T_{elin}$$

This first correction factor $k1_{corr}$ once again is stored in the non-volatile memory in control device 1005 as part of first correction characteristics curve 301. The method then continues with step 405.

In a fourth specific embodiment, if internal combustion engine 1000 includes a plurality of combustion chambers 1040, then one of the aforementioned specific embodiments is implemented in modified form for each combustion chamber 1040 either alternatively or additionally.

In the case of an internal combustion engine 1000 having four combustion chambers 1040, for instance, combustion chambers 1040 of internal combustion engine 1000 are denoted by an index i=1, 2, 3, 4. For instance, to calibrate fuel injectors 1045, one of the aforementioned specific developments is analogously applied to each combustion chamber 1040 individually and all fuel injectors 1045 of all combustion chambers 1040 sequentially, for instance starting with combustion chamber 1040, denoted by 1, of internal combustion machine 1000, for example in the sequence i=1, 2, 3, 4. To this end, index i is stored in the non-volatile memory in control device 1005 as variable, for instance, and the aforementioned specific embodiment is repeated as a function of index i in the manner known to one skilled in the art until all fuel injectors 1045 of all combustion chambers have been calibrated. The exemplary embodiments and/or exemplary methods of the present invention is not restricted to the sequence 1, 2, 3, 4. The method according to the present invention is applied analogously in any other sequence or if not all combustion chambers 1040 of internal combustion engine 1000 are to be calibrated.

In addition, in a modification of the fourth specific embodiment, an individual setpoint injection $Q_{ind}$ (i) is determined in step 410 as a function of the injection quantity $Q_{driver}$ desired by the driver. For example, injection quantity $Q_{driver}$ desired by the driver is first distributed to individual combustion chambers 1040 in such a way that the same individual setpoint injection $Q_{ind}$ (i) is provided for each combustion chamber 1040. For instance, the individual setpoint injections $Q_{ind}$ (i) for an internal combustion engine 1000 having four combustion chambers 1040 are determined in the following manner:

$$Q_{ind}(1)=Q_{ind}(2)=Q_{ind}(3)=Q_{ind}(4)=¼*Q_{driver}.$$

For instance, injection quantity $Q_{driver}$=45.2 mg desired by the driver for combustion engine 1000 having four combustion chambers 1040 is distributed to the four combustion chambers 1040 of internal combustion engine 1000 in such a way that individual setpoint injection $Q_{ind}$(i) amounts to $Q_{ind}$(i)=11.3 mg for each combustion chamber 1040.

Then, in an additional step, the particular combustion chamber 1040 in which the calibration of fuel injector 1045 is to take place is selected from among all combustion chambers 1040 disposed in internal combustion engine 1000. For example, combustion chamber 1040 designated by index i=1 is selected first.

Then, setpoint injection $Q_{setpoint}$ (i) is determined as a function of injection quantity $Q_{driver}$ for the particular combustion chamber 1040 in which the calibration of fuel injector 1045 is carried out. The determination takes place as described in step 410 of the first specific embodiment; in this instance, however, instead of injection quantity $Q_{driver}$ desired by the driver, individual setpoint injection $Q_{ind}$ (i) in which the calibration of fuel injector 1045 is taking place is used for combustion chamber 1040. For individual setpoint injection $Q_{ind}$(1)=11.3 mg, for instance, setpoint injection $Q_{setpoint}$(1)=11 mg is determined for combustion chamber 1040 designated by index i=1.

In an additional step, a difference deltaQ between individual setpoint injection $Q_{ind}$ (i) and setpoint injection $Q_{setpoint}$ (i) is then determined for combustion chamber 1040 in which the calibration of fuel injector 1045 is taking place. For example, difference deltaQ between setpoint injection $Q_{setpoint}$(1) and individual setpoint injection $Q_{ind}$(1) amounts to deltaQ=11.3 mg–11 mg=0.3 mg.

In an additional step, setpoint injection $Q_{setpoint}$ (i) of combustion chambers 1045 in which no calibration of fuel injector 1045 is taking place, is then determined as a function of difference deltaQ and individual setpoint injection $Q_{ind}$ (i). The difference deltaQ is added in equal parts, for instance, to individual setpoint injection $Q_{ind}$ (i) of combustion chambers 1040 in which no calibration of fuel injector 1045 is taking place, in order to determine setpoint injection $Q_{setpoint}$ (i) in this manner:

$$Q_{setpoint}(i)=Q_{ind}(i)+\text{delta}Q/(\text{number of combustion chambers }1040-1)$$

For example, setpoint injections $Q_{setpoint}$ (i) of combustion chambers 1040 in which no calibration of fuel injector 1045 is taking place, are determined in the following manner:

$$Q_{setpoint}(2)=Q_{ind}(2)+\text{delta}Q/3=11.3\text{ mg}+0.1\text{ mg}=11.4\text{ mg},$$

$$Q_{setpoint}(3)=Q_{ind}(3)+\text{delta}Q/3=11.3\text{ mg}+0.1\text{ mg}=11.4\text{ mg},$$

$$Q_{setpoint}(4)=Q_{ind}(4)+\text{delta}Q/3=11.3\text{ mg}+0.1\text{ mg}=11.4\text{ mg},$$

In this way the entire injection quantity $Q_{driver}$ desired by the driver is implemented as an average value across all combustion chambers 1040, so that an abrupt change in the torque available at crankshaft 1090 is avoided.

The exemplary embodiments and/or exemplary methods of the present invention is explained using the example of internal combustion engine 1000 having direct gasoline injection shown in FIG. 1, and a combustion method having a homogenous air-fuel mixture and self-ignition. In the same way, the exemplary embodiments and/or exemplary methods of the present invention is able to be used for homogenous and stratified charge combustion methods with externally supplied ignition, such as with the aid of a spark plug.

In the exemplary embodiment, the determination of the actually resulting indicated work is described with the aid of the evaluation of the combustion chamber pressure. Other methods for determining the actually resulting indicated work, for instance using a torque sensor or engine speed evaluation, are possible as well. The resulting indicated work is determined from the combustion chamber pressure; the combustion chamber pressure is not measured by combustion chamber pressure sensors, but determined as a function of the torque or the acceleration of crankshaft 1090 in the manner known to one skilled in the art. In the case of the torque sensor, the combustion chamber pressure is determined as a function of the torque in the manner known to one skilled in the art. Apart from frictional losses, the torque is approximately proportional to the combustion chamber pressure. In the case of an engine speed evaluation, an acceleration of crankshaft 1090 is determined from a torque balance at crankshaft 1090 in a time window around the time of combustion in combustion chamber 1040 in which the calibration of fuel injector 1040 is taking place. The acceleration of crankshaft 1090 is proportional to the resulting indicated work in combustion chamber 1040 and is determined in a manner known to one skilled in the art. The method according to the present invention is then applied accordingly.

Implementing the method according to the present invention on a test stand makes it possibly to maintain a constant engine speed of internal combustion engine 1000 and a constant torque at crankshaft 1090, so that all interpolation points of entire valve characteristics curve 201 are able to be determined successively in an uncomplicated manner.

Figure 4:
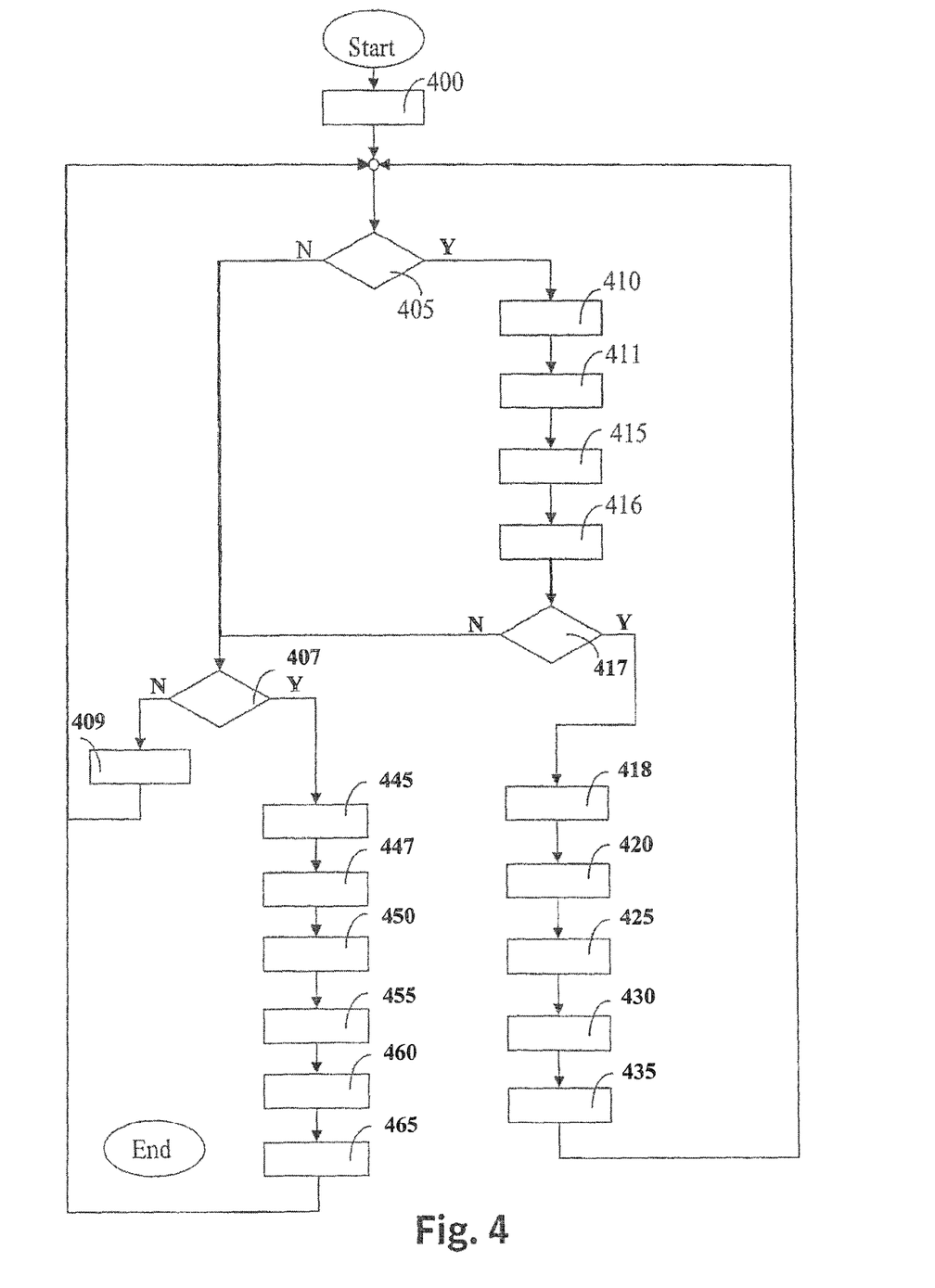
FIG. 4 shows a flow chart, which describes an exemplary sequence of the method according to the present invention.

For example, the method described in the exemplary embodiment is implemented in an especially simple manner as a computer program which realizes all of the steps from the flow chart illustrated in FIG. 4. This computer program is developed on a workstation computer outside of control device 1005, for example, an then installed in control device 1005 with the aid of a computer program product containing the program code, for instance in the form of a machine-readable carrier such as a non-volatile memory. The computer program product is then implemented in control device 1005 by first input unit 1010, second input unit 1015, and third input unit 1020, determination unit 1025, comparison unit 1030, and correction unit 1035, when internal combustion engine 1000 is operated.

What is claimed is:

1. A control device for calibrating a fuel injector of an internal combustion engine, comprising:
   a first input unit to specify a first relationship between an injection quantity and an actuating variable of the fuel injector for implementing the injection quantity;
   a second input unit to specify a setpoint injection quantity;
   a third input unit to specify at least one setpoint value for the actuating variable of the fuel injector as a function of the first relationship for implementing the first setpoint injection quantity;
   a determination unit to determine an indicated work resulting from the implementation of the at least one setpoint value for the actuating variable of the fuel injector;
   a comparison unit to compare a variable as a function of the determined resulting indicated work to an expected value; and
   a correction unit to correct the at least one setpoint value for the actuating variable of the fuel injector (1045) as a function of the comparison result.

2. A computer-readable medium having a computer program, which is executable by a processor, comprising:
   a program code arrangement having program code for calibrating a fuel injector of an internal combustion engine by performing the following:
   a) specifying a first relationship between an injection quantity and an actuating variable of the fuel injector for implementing the injection quantity;
   b) specifying a setpoint injection quantity;
   c) specifying at least one setpoint value for the actuating variable of the fuel injector according to the first relationship, for implementing the setpoint injection quantity;
   d) determining an indicated work resulting from implementing the at least one setpoint value for the actuating variable;
   e) comparing a variable as a function of the determined resulting indicated work to an expected value; and
   f) correcting the at least one setpoint value for the actuating variable of the fuel injector as a function of the comparison result.

3. A method for calibrating a fuel injector of an internal combustion engine, the method comprising:
   a) specifying a first relationship between an injection quantity and an actuating variable of the fuel injector for implementing the injection quantity;
   b) specifying a setpoint injection quantity;
   c) specifying at least one setpoint value for the actuating variable of the fuel injector according to the first relationship, for implementing the setpoint injection quantity;
   d) determining an indicated work resulting from implementing the at least one setpoint value for the actuating variable;
   e) comparing a variable as a function of the determined resulting indicated work to an expected value; and
   f) correcting the at least one setpoint value for the actuating variable of the fuel injector as a function of the comparison result.

4. The method of claim 3, wherein the at least one setpoint value for the actuating variable of the fuel injector is corrected in operation c) with the aid of a first correction characteristics curve, wherein the correction in operation f) is implemented with the aid of the first correction characteristics curve, and wherein the correction characteristics curve in operation f) is corrected as a function of the comparison result.

5. The method of claim 3, wherein the electric control period of the fuel injector is selected as actuating variable of the fuel injector.

6. The method of claim 3, wherein the setpoint injection quantity is selected greater than a first threshold value, which is a smooth running limit of the internal combustion engine.

7. The method of claim 3, wherein the injection quantity is selected as the variable as a function of the determined resulting indicated work.

8. The method of claim 7, wherein the injection quantity is determined as a function of the determined resulting indicated work and the engine speed, with the aid of a characteristics map.

9. The method of claim 3, wherein the setpoint injection quantity is selected as expected value.

10. The method of claim 9, wherein the setpoint injection quantity according to the first relationship is implemented into a single setpoint actuating variable, and the correction in f) according to a first correction factor is carried out as a function of the quotient between the setpoint injection quantity, and the actual injection quantity derived from the resulting indicated work.

11. The method of claim 3, wherein the setpoint injection quantity is subdivided into a basic injection quantity and a measured injection quantity, wherein the basic injection quantity is implemented by a basic setpoint actuating variable as a function of the first relationship, and wherein the measured injection quantity is implemented by a measured setpoint actuating variable as a function of the first relationship.

12. The method of claim 11, wherein the basic injection quantity is implemented by the basic setpoint actuating variable according to the actuating variable of the fuel injector corrected by the first correction factor.

13. The method of claim 11, wherein the measured setpoint actuating variable assigned to the measured injection quantity via the specified first relationship is varied as a function of the deviation between the variable as a function of the determined resulting indicated work and the expected value in order to adjust the variable as a function of the determined resulting indicated work to the expected value, and the correction of the at least one setpoint value for the actuating variable of the fuel injector at f) is implemented as a function of a determined corrected measured actuating variable, at which the deviation between the variable as a function of the determined resulting indicated work and the expected value lies within a specified tolerance range.

14. The method of claim 11, wherein the first correction factor is determined as a function of the quotient from the measured setpoint actuating variable and the corrected measured actuating variable.

15. The method of claim 11, wherein the correction carried out at f) according to the first correction factor is formed as a function of the quotient between a difference from the setpoint injection quantity and the basic injection quantity, and a difference from the actual injection quantity derived from the determined resulting indicated work, and the basic injection quantity.

16. The method of claim 3, wherein the resulting indicated work itself is selected as the variable that is a function of the determined resulting indicated work.

17. The method of claim 16, wherein the resulting indicated work is determined as a function of the combustion chamber pressure.

18. The method of claim 16, wherein a setpoint value for the resulting indicated work is selected as expected value.

19. The method of claim 18, wherein the setpoint value for the resulting indicated work is determined by implementing the setpoint injection quantity implemented into a single setpoint actuating variable according to the first relationship, and wherein the determined resulting indicated work that comes about is selected as setpoint value for the resulting indicated work.

* * * * *